Aug. 14, 1928.
C. S. CARD
1,680,449
ROLLER AND BEARING SUPPORT THEREFOR
Filed Dec. 5, 1927
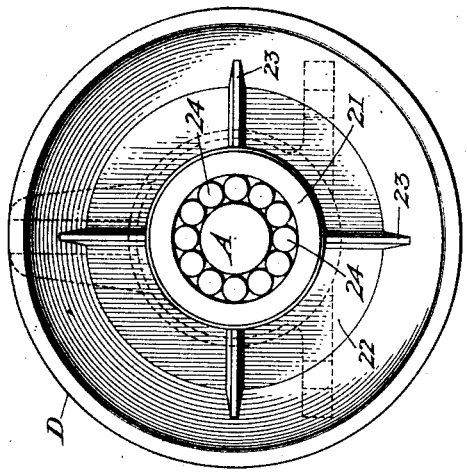
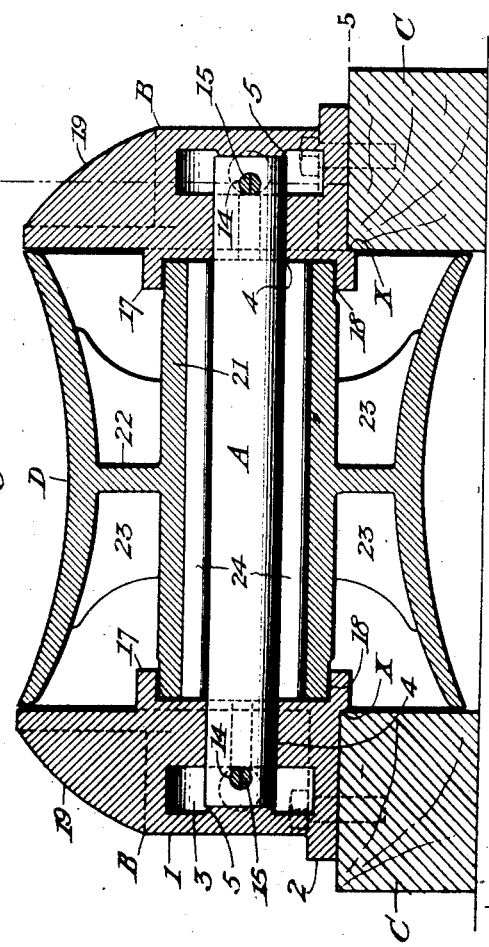
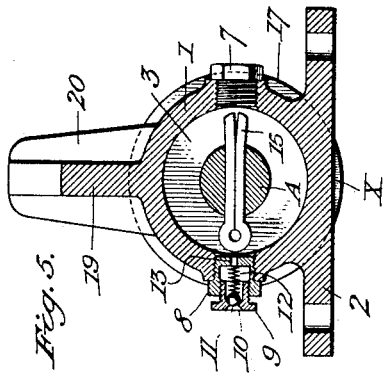
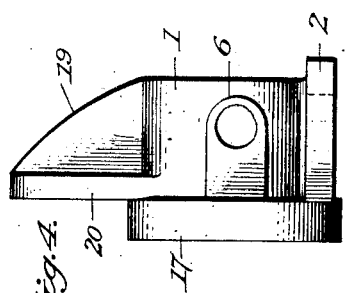
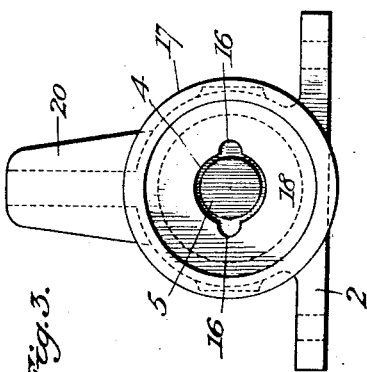
Inventor
Charles S. Card
By
H. S. Bailey Attorney.

Patented Aug. 14, 1928.

UNITED STATES PATENT OFFICE.

CHARLES S. CARD, OF DENVER, COLORADO.

ROLLER AND BEARING SUPPORT THEREFOR.

Application filed December 5, 1927. Serial No. 237,899.

My invention relates to improvements in rope and other load supporting rollers and bearing supports therefor, more particularly for use in connection with haulage ropes to keep them from dragging on the ground.

The main object of the invention is to provide mechanism of this character in which spreading of the bearing boxes or binding of the roller by the bearing boxes is prevented.

Further, to provide a pair of bearing boxes and an axle supported thereby, the ends of which engage the end walls of said boxes to prevent their inward movements, said axle being provided with pins which engage the boxes and prevent spreading of the same, the boxes being provided with inclosed reservoirs for supplying lubricant to the hub of a roller mounted on said axle.

These and other objects which will hereinafter appear, are accomplished by the mechanism illustrated in the accompanying drawings in which:

Fig. 1 is a vertical sectional view through a roller and a pair of bearing boxes constructed in accordance with my invention.

Fig. 2 is an end view of the roller, the near bearing box being removed.

Fig. 3 is a front view of one of the boxes, looking at the inner face thereof.

Fig. 4 is a side view thereof, and

Fig. 5 is a sectional view on the line 5—5 of Figure 1.

In practical operation it has been found that rope and other load supporting rollers of this character, in present use, are unsatisfactory for the reason that there is no provision in such constructions for preventing spreading of the bearing boxes, or for preventing binding of the boxes against the ends of the roller, whereby the roller is either permitted a sliding movement on its axle, or its free rotation is retarded, thus causing unnecessary wear both to the rope and roller.

The present invention however, entirely overcomes these objectionable features, by means of the improved construction of the boxes in connection with the roller supporting axle, as will now be particularly described.

Referring to the accompanying drawings:

The letter A designates an axle and B a pair of supports or boxes therefor, and as these boxes are identical in construction a description of one of them will suffice.

The improved box comprises a substantially circular body 1, the lower portion of which terminates in a horizontally disposed bolt flange 2 which is adapted to rest upon any suitable character of support C and to be bolted thereto. The body is formed with a circular chamber 3 and a shaft or axle opening 4 extends from the chamber 3, out through the inner face of the box, the chamber 3 being concentric with the opening 4. The axle A fits snugly but rotatably in the openings 4 of the two boxes, and the ends of the axle abut against circular bosses 5, which are formed on the end walls of the chambers 3, and thus prevent further inward movement of either box.

On diametrically opposite sides of the body of the box are formed threaded holes 6, which extend into the chamber 3, the axial line through these holes, and the axial center of the axle hole 4, being on the same plane. One of the holes 6, in each box is adapted to be closed by an ordinary screw plug 7, and the other hole is closed by an oil or grease plug of a style in common use, and comprising a hollow plug 8, in which is screwed a hollow cap 9, the said cap having an entrance hole 10, which is normally closed by a ball valve 11, which is held in place by a coil spring 12, which is interposed between the ball valve and the end of the plug 8, the said end having a hole 13, which forms a communication between the interior of the plug 8 and the chamber 3. Thus, when the spout of an oil or grease cup is inserted in the hole 10, the ball valve is depressed and lubricant may be injected into the plug 8, whence it passes through the hole 13 into the chamber or reservoir 3. Holes 14 are formed through the end portions of the axle A, and a pin 15, preferably a cotter pin, is inserted through one of the holes 6 in each box and through the hole 14 in the end of the axle, and the holes 14 are at such distances from the ends of the axle, that when the said ends of the axle bear against the bosses 5, the pins will engage the inner end walls of the chambers 3, thus preventing spreading or outward movement of the boxes on the axle. It will thus be seen that when the boxes are placed upon the ends of the axle, and the pins 15 are inserted in the holes 14 in the end portions of the axle, the boxes are held in fixed positions on the axle against endwise movement in either direction.

Opposite oil grooves 16 are formed in the face of each axle bearing hole 4, and extend from the chamber 3 out through the inner face of the box, and the inner face of the box is formed with a circular ring or collar 17 which defines a circular recess 18 to receive the end of the hub of a roller to be presently described. The lowest point of the collar 17 is slightly below the bottom of the bolt flange 2, and this part of the collar forms a shoulder, as indicated at X in Fig. 1, which defines the outward movement of the box upon its support C. A vertical rib 19 is formed upon the top side of the box, and is of a height corresponding to the highest point of the roller used, and the inner edge of this rib terminates in a strengthening rib or flange 20, the inner face of which is in line with the shoulder X. The ribs 19 curve outwardly from the tops of the boxes to the point where they join the flanges 20, and assist in guiding the rope when placing the same upon the roller, or in shunting the rope away from the boxes, if the said rope should slip off the roller.

Upon the axle A is mounted a roller D which may be of any style to meet the requirements in the case, but which in the present instance is a hollow metal roller, having an inwardly curved or concaved face, and provided with a hub 21, the ends of which fit rotatably in the recesses 18 in the opposing ends of the boxes B, whereby entrance of dirt or grit to the interior of the hub is prevented. The rim of the roller is connected with the hub by a central integral wall 22 and by radial integral ribs 23, as shown.

The bore of the hub is of somewhat greater diameter than that of the axle A, and anti-friction rollers 24 are inserted in the space between the axle and the hub, and thus support the roller. The oil or grease chambers 3 are supplied through the oil plugs 8, and the oil or grease passes through the grooves 16 to the ends of the roller hub and works in between the anti-friction rollers 24, thereby lubricating the surfaces of these rollers as well as the surface of the axle.

As the roller D has an anti-friction bearing connection with the axle A, and the axle A is rotatably mounted in the boxes B, it will be seen that resistance to the free rotary motion of the roller is practically eliminated, and the roller will therefore operate with maximum ease.

From the foregoing description taken in connection with the drawings, it will be seen that the improved construction prevents either spreading of the bearing boxes, or binding of said boxes upon the ends of the roller, thus eliminating the objectionable features common to rope and other load supporting rollers in common use.

Having described my invention, what I claim as new and desire to secure by Letters Patent, is:

1. In mechanism of the character described, the combination of bearing boxes having inclosed chambers and openings extending from said chambers through the inner faces of the boxes, an axle supported in said openings, its ends abutting against the outer end walls of said chambers, the inner faces of said boxes being formed with circular recesses, and a roller mounted on said axle having a hub whose ends extend into said circular recesses; and pins extending through the end portions of said axle and engaging the inner end walls of said chambers, thereby to prevent spreading of the boxes on said axle, said boxes each having opposite openings extending into said chambers, and means for normally closing said openings.

2. In mechanism of the character described, the combination with opposing bearing boxes having inclosed oil chambers, bearing holes extending from said chambers through the inner faces of the boxes, circular recessses in the inner faces of said boxes concentric with said bearing holes and oil grooves in the marginal faces of said bearing holes; of an axle supported in said bearing holes, its ends abutting against the outer end walls of said oil chambers, thereby defining the inward movements of said boxes on said axle, pins extending through the end portions of said axle, and engaging the inner end walls of said oil chambers, thereby preventing spreading of the boxes on the axle, said boxes each having opposite holes extending into said chambers and plugs for normally closing said holes, and a roller on said axle having a hub, the ends of which enter the circular recesses in the inner faces of said boxes.

3. A bearing box comprising a body portion having an inclosed oil chamber, opposite threaded holes extending into said chamber, a bearing hole extending from said chamber through the inner face of the box, said bearing hole having opposite oil grooves in its marginal wall, a circular recess being formed in said inner face concentric with said bearing hole, the bottom portion of said body having a horizontal bolt flange thereon.

4. The structure as in claim 3, wherein the body portion is formed with a vertically disposed rib, having an outwardly curved and inclined outer edge.

In testimony whereof, I affix my signature.

CHARLES S. CARD.